(12) United States Patent
Swartz et al.

(10) Patent No.: US 12,508,914 B2
(45) Date of Patent: Dec. 30, 2025

(54) SENSORLESS BACKUP FOR MOTOR SPEED AND POSITION

(71) Applicant: GM GLOBAL TECHNOLOGY OPERATIONS LLC, Detroit, MI (US)

(72) Inventors: Michael Duncan Swartz, Waterford, MI (US); Young Joo Lee, Rochester, MI (US); Brian J. Gallert, Waterford, MI (US); Anno Yoo, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 398 days.

(21) Appl. No.: 17/731,988

(22) Filed: Apr. 28, 2022

(65) Prior Publication Data

US 2023/0347744 A1 Nov. 2, 2023

(51) Int. Cl.
| | |
|---|---|
| H02P 27/08 | (2006.01) |
| B60L 3/00 | (2019.01) |
| G01D 5/244 | (2006.01) |
| G01P 3/44 | (2006.01) |
| H02P 6/18 | (2016.01) |
| H02P 6/182 | (2016.01) |
| H02P 21/14 | (2016.01) |

(52) U.S. Cl.
CPC ........ *B60L 3/0061* (2013.01); *G01D 5/24485* (2013.01); *G01P 3/44* (2013.01); *H02P 6/18* (2013.01); *H02P 6/182* (2013.01); *H02P 21/14* (2013.01); *B60L 2240/12* (2013.01)

(58) Field of Classification Search
CPC .. H02P 6/18; H02P 6/182; H02P 21/14; H02P 23/18; H02P 23/0004; H02P 23/12
See application file for complete search history.

(56) References Cited

U.S. PATENT DOCUMENTS

| | | | |
|---|---|---|---|
| 9,077,227 B2 | 7/2015 | Theobald et al. | |
| 2011/0012544 A1* | 1/2011 | Schulz | B60L 15/08 |
| | | | 318/400.33 |
| 2014/0109080 A1* | 4/2014 | Ricci | G06F 8/61 |
| | | | 717/174 |
| 2017/0227567 A1 | 8/2017 | Son et al. | |
| 2020/0028454 A1 | 1/2020 | Kinomura | |
| 2021/0165011 A1* | 6/2021 | Thyagarajan | G01D 5/14 |
| 2021/0273505 A1 | 9/2021 | Jing et al. | |

* cited by examiner

*Primary Examiner* — Muhammad S Islam
(74) *Attorney, Agent, or Firm* — Quinn IP Law

(57) ABSTRACT

A method and system are contemplated for determining a final speed and position of a motor used in an electric vehicle. The final speed and position is calculated as a function of a sensed position when a resolver of a position system is available and as a function of a sensorless position when the resolver is unavailable.

20 Claims, 5 Drawing Sheets

SENSORLESS BACKUP FOR MOTOR SPEED AND POSITION

INTRODUCTION

The present disclosure relates to a backup system for use in determining speed and position for an electric motor, such as a sensorless backup capable of enabling a traction motor included within a vehicle to continue functioning independently of information provided from a resolver.

An electrically or partially electrically driven device, such as a vehicle, automobile, vessel, airplane, etc., may be propelled or otherwise act in response to mechanical energy provided from a traction motor. Devices relying upon such electric motors, particularly when the motor is included as part of a powertrain or drivetrain used to propel the device, may include a control system for controlling operations of the device according to a position and a speed of the electric motor, i.e., a rotational speed and a rotational position. Measuring the speed and position of an electric motor with accuracy and precision may be particularly relevant to assuring proper control of the employing device, and potentially challenging given electric motors typically operate at a relatively high rate of speed and within any number of operating environments.

It is understood to employ a resolver with electric motors for purposes of generating the desired measurements for speed and position. A resolver may be considered as an electromechanical device, transducer, etc. configured for attaching to or positioning near rotatable members of an electric motor. Sensors, circuits, inductors, windings, couplers, etc. of the resolver may interact with the motor to facilitate generating measurements capable of being interpreted/calculated for purposes of accurately and precisely determining speed and position of the motor. One type of resolver, for example, relies upon an excitation voltage or other response between a stator and a rotary member attached to the motor such that rotation of the rotary member induces electrical signaling within the stator member sufficient to reflect positioning of the motor, e.g., the resolver generates a value representing positioning of the motor that can be normalized or related to representative units of measure. The control system of the device may then rely upon the speed and position derived from the determinations of the resolver to implement corresponding controls of the device, including those associated with directing operations of the electric motor.

SUMMARY

Disclosed herein is a backup system for determining speed and position of an electric motor. The backup system may be helpful as an auxiliary system capable of augmenting a resolver or other measurement tool employed to determine speed and position of the motor. The backup system, for example, may be used to provide speed and position determinations when the resolver is unavailable, such as when one or more measurements made by the resolver are unavailable or otherwise in need of supplementation. The backup system may do so by generating the speed and position determinations in a sensorless manner according to calculations performed based on metrics available when the resolver is unavailable.

One aspect of the present disclosure relates to a method for determining a final speed and position of a traction motor used in an electric vehicle. The method may include calculating the final speed and position of the traction motor as a function of a sensed position determined with the resolver when a resolver of a position system is available. The method may include calculating the final speed and position of the traction motor as a function of a sensorless position determined with a sensorless system when the resolver is unavailable.

The method may include, after calculating the final speed and position according to the sensed position, executing an initialization mode before calculating the final speed and position as a function of the sensorless position.

The method may include the initialization mode including initializing the sensorless system with one or more last known values of the position system.

The method may include beginning a diagnostics process prior to beginning the initialization mode, the diagnostics process determining whether the resolver is available or unavailable.

The method may include completing the initialization mode before completing the diagnostics process.

The method may include resetting the sensorless system responsively to the diagnostics process indicating the resolver to be available.

The method may include resetting the sensorless system by zeroing the last known values or one or more other values associated with the sensorless system.

The method may include the position system including a first observer for calculating the final speed and position as a function of an angle error and one or more variables used to adjust gain.

The method may include, when the resolver is available, determining the angle error as a function of a final position feedback for the final position, a final speed feedback for the final speed, and the sensed position.

The method may include the sensorless system including a second observer for calculating a sensorless angle error and a third observer for calculating the sensorless position as a function of the sensorless angle error.

The method may include generating the final speed and position for use with a controller included within the vehicle whereby the controller relies thereon to facilitate one or more vehicle operations.

The method may include, when the resolver is unavailable and the sensorless system is unavailable, implementing a shutdown of the traction motor.

One aspect of the present disclosure relates to a system for determining a final speed and position of a motor used in an electric vehicle. The system may include a resolver configured to determine a sensed position responsively to measuring rotation of the motor, a sensorless system configured to calculate a sensorless position responsively to a voltage and a current of the motor, and a position system configured to operate according to a first mode and a second mode, the first mode calculating the final speed and position as a function of the sensed position, the second mode calculating the final speed and position as a function of the sensorless position.

The system may include an initialization system configured to facilitate an initialization of the sensorless system while the position system is operating according to the first mode such that the initialization system provides the sensorless system with one or more last known values of the position system.

The system may include the position system being configured to operate according to the first mode when the sensed position is available from the resolver and according to the second mode when the sensed position is unavailable and a speed of a vehicle having the motor is above a threshold. The threshold may be associated with measurable amounts of back electromotive force (EMF) being present for the sensorless system to calculate the sensorless position.

The system may include the sensorless system being configured to adjustment the voltage and the current to account for a timing difference between the motor and measurement of the voltage and the current.

One aspect of the present disclosure relates to a system for determining a final speed and position of a motor used in an electric vehicle. The system may include a first observer configured to operate according to execution of a plurality of first instructions stored on a corresponding non-transitory computer readable storage medium. The first instructions may be sufficient to: calculate the final speed and position as a function of an angle error; and calculate the angle error as a function of a final position feedback, a final speed feedback, and either one of a sensed position and a sensorless position. The system may include a second observer configured to operate according to execution of a plurality second instructions stored on a corresponding non-transitory computer readable storage medium. The second instructions may be sufficient to calculate a sensorless angle error as a function of a sensorless speed feedback, a sensorless flux, a sensorless DQ current and a sensorless DQ voltage. The system may include a third observer configured to operate according to execution of a plurality of third instructions stored on a corresponding non-transitory computer readable storage medium. The third instructions may be sufficient to calculate a sensorless speed and the sensorless position as a function of the sensorless angle error and a sensorless speed feedback.

The system may include the third instructions being sufficient to operate according to an initialization mode where the third observer utilizes the final position feedback as the sensorless position and the final speed as the sensorless speed and to operate according to a running mode where the third observer calculates the sensorless speed and position independently of on the final speed and position.

The system may include the second instructions being sufficient to operate according to the initialization mode where the second observer utilizes the final speed and position to calculate the sensorless flux, the sensorless DQ current, and the sensorless DQ voltage and to operate according to the running mode where the second observer calculates the sensorless angle error as a function of the sensorless speed feedback.

The system may include the second instructions being sufficient to implement an adjustment for a timing difference between the motor and voltage and current readings used to calculate the sensorless DQ voltage and current.

The above features and advantages, and other features and attendant advantages of this disclosure, will be readily apparent from the following detailed description of illustrative examples and modes for carrying out the present disclosure when taken in contact with the accompanying drawings and the appended claims. Moreover, this disclosure expressly includes combinations and sub-combinations of the elements and features presented above and below.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
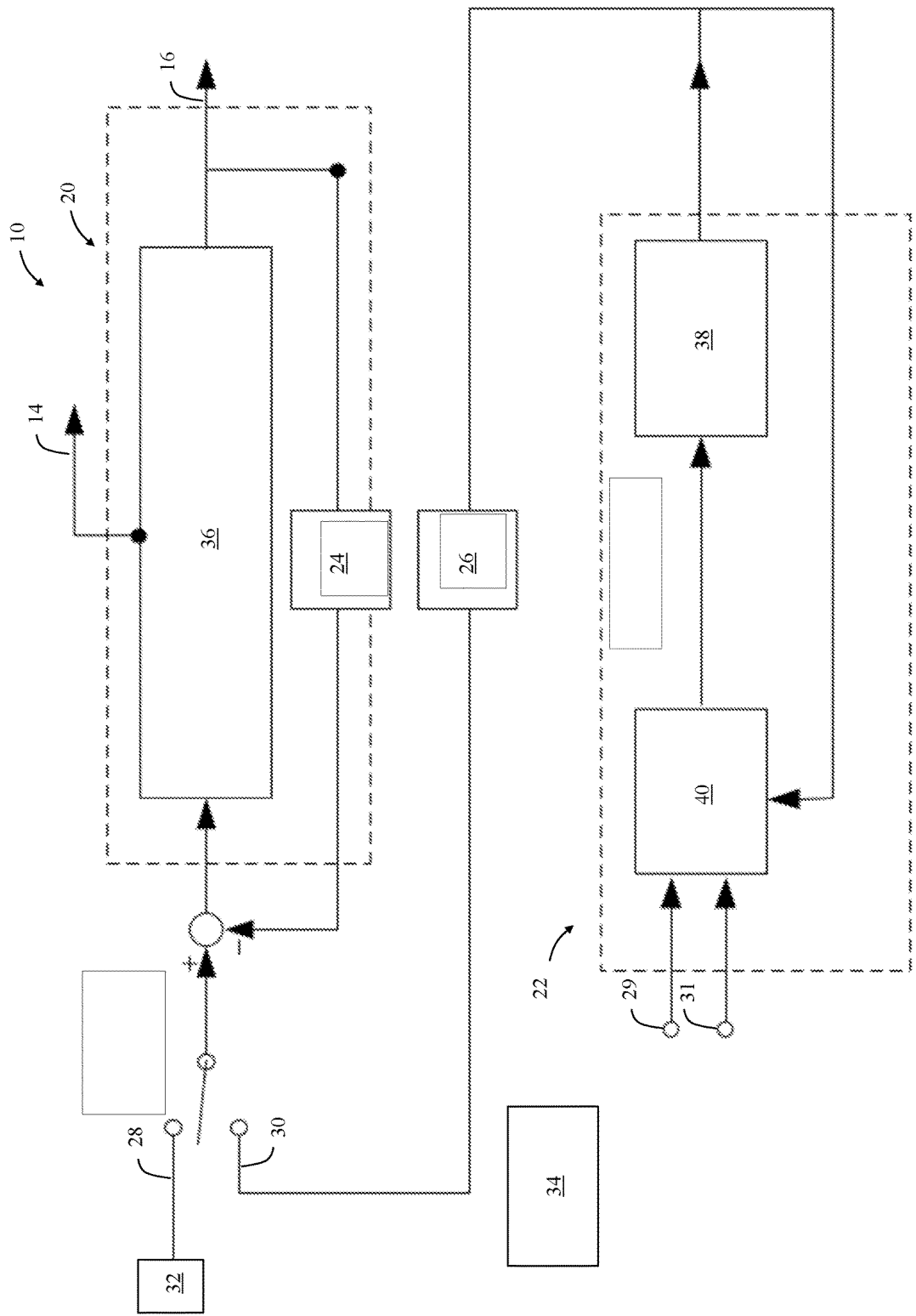
FIG. 1 illustrates a schematic view of a system for providing sensorless positional information in accordance with one non-limiting aspect of the present disclosure.

FIG. 1 illustrates a system 10 for providing sensorless positional information in accordance with one non-limiting aspect of the present disclosure. The system 10 is predominantly described for exemplary purposes with respect to calculating a final speed 14 and a final position 16 for a motor (not shown) with the option to generate the final speed and position 14, 16 in a sensorless manner. In the case of the motor being included within a device, such as traction type of motor included in a vehicle, the final speed and position 14, 16 may be useful in facilitating feedback or other control associated with operating the motor, e.g., to enable a motor control unit (MCU) or other electronic control unit (ECU) to utilize the final speed and position 14, 16 to control acceleration or otherwise manage another type of vehicle operation dependent on the motor. The predominance of the electric motor being used to facilitate driving a vehicle is highlighted for illustrative purposes as other types of electric motors utilized within heavy equipment, infrastructures, etc. may similarly benefit from the disclosed sensorless methodology for determining the final speed and position 14, 16.

The system 10 is described for illustrative purposes with respect to calculating the final speed and position 14, 16 according to information, processes, data, values, etc. associated with a position system 20 and a sensorless system 22. The differentiation between position and sensorless systems 20, 22 is shown for exemplary purposes and without intending to limit the scope and contemplation of the present disclosure. The systems 20, 22 need not be isolated from each other or otherwise capable of operating independently or separately from the other, i.e., both may be collectively implemented within a common architecture and/or isolated from each other on different chip sets. As described below in more detail, however, the cascaded arrangement of the systems 20, 22 enables a closed-loop feedback 24 of the position system 20 to operate independently of a closed-loop feedback 26 of the sensorless system 22. The independent feedbacks 24, 26 permit the systems 20, 22 to employ self-referencing capabilities, and thereby, independent correction and adjustment of gains and other self-directed variables, which may be helpful with filtering and maximizing accuracy. The generation of values for representing final speed and position 14, 16 of the motor is likewise described for non-limiting purposes as the present disclosure fully contemplates its use and application in facilitating additional calculations and operations, including others that may benefit from information generated with the sensorless system 22, i.e., the information generated with the sensorless system 22 may be used elsewhere in the device, optionally without having to be correspondingly processed with the position system 20.

An overall controller (not shown) or element in the vehicle may be tasked with maintaining the system 10 or otherwise including programming, code, software, algorithms, etc. to facilitate the operations considered for the position and sensorless systems 20, 22. One non-limiting aspect of the present disclosure contemplates various determinations, calculations, processes, and operations being performed according to execution of a plurality of instructions stored on a corresponding non-transitory computer readable storage medium, optionally with such instructions being executed with a processor of the overall controller or another processor, e.g., each set of instructions may be executed or acted upon by its own processor. The system 10, or the instructions associated therewith, need not necessarily be distinguished along operational boundaries, however, the position system 20 is shown to be separate from the sensorless system 22 for illustrative purposes in order to show the systems 20, 22 optionally being configured according to the cascaded arrangement. The position system 20 is predominately referred to as generating the final speed and position 14, 16 to differentiate its position and speed determinations from a sensed position 28 and a sensorless position 30. The final speed and position 14, 16 in this manner may be considered as a last speed and position calculation before output to dependent systems.

One non-limiting aspect of the present disclosure contemplates the sensed position 28 being determined with a resolver 32, such as of the type described above having capabilities appropriate for producing values representing positioning of the motor. The resolver 32 may be of the type configured to generate positional values in response to movement of the motor inducing electrical coupling or other excitations within a measurement element (not shown). Such a resolver 32 is noted for exemplary purposes as other devices or tools having capabilities for measuring position of the motor may similarly be used to generate a value commensurate with the sensed position 28. The resolver 32, as such, is presented as a measuring apparatus understood by one having ordinary skill in the art, particularly with respect to those skilled in the art of using sensors to assess positioning of rotors or other rotatable members of an electric motor. The resolver 32 may be characterized as a feature operable for generating a positional value typically relied upon by the position system 20 for calculating the final speed and position 14, 16, and thereby, typically relied upon in operating the device, vehicle or the like. Optionally, an encoder or a magnetic/induction sensor may also be used instead or with the resolver 32

The sensorless system 22 may be atypically relied upon to supplement or augment the sensed position 28 with the sensorless position 30. The sensorless position 30 may be derived from inverter and current measurements 29, 31 taken from the motor when the resolver 32 is unavailable. Such measurements may optionally correspond with information collected to facilitate operations of the device that are independent or that are capable of operating or functioning independently of the resolver 32. In this manner, values used by other systems within the device and/or otherwise available despite the resolver 32 being unavailable, may be utilized in accordance with the present disclosure to facilitate generating the sensorless position 30.

The sensorless position 30 may replace the sensed position 28, such as when the resolver 32 is unavailable or the information therefrom is unreliable, and/or the sensorless position 30 may be used to verify, adjust or otherwise manipulate the sensed position 28 into a more accurate or reliable value. One methodology disclosed herein contemplates the position system 20 relying upon the sensed position 28 when operating according to a first mode and relying upon the sensorless position 30 operating according to a second mode, i.e., independently relying on one of the positions 28, 30 depending on the operating mode. The first mode may be characterized as a normal or typical running mode of the vehicle associated with circumstances when the sensed position 28 is deemed reliable or otherwise available, e.g., a sensed mode. The second mode may be characterized as a sensorless mode or an infrequent, temporary mode of the vehicle associated with circumstances when the sensed position 28 may be deemed unavailable or unreliable. A diagnostics module 34 may optionally be included to assess the state of the resolver 32 or otherwise make an assessment as to whether the sensed position 28 may be considered as available.

Figure 2:
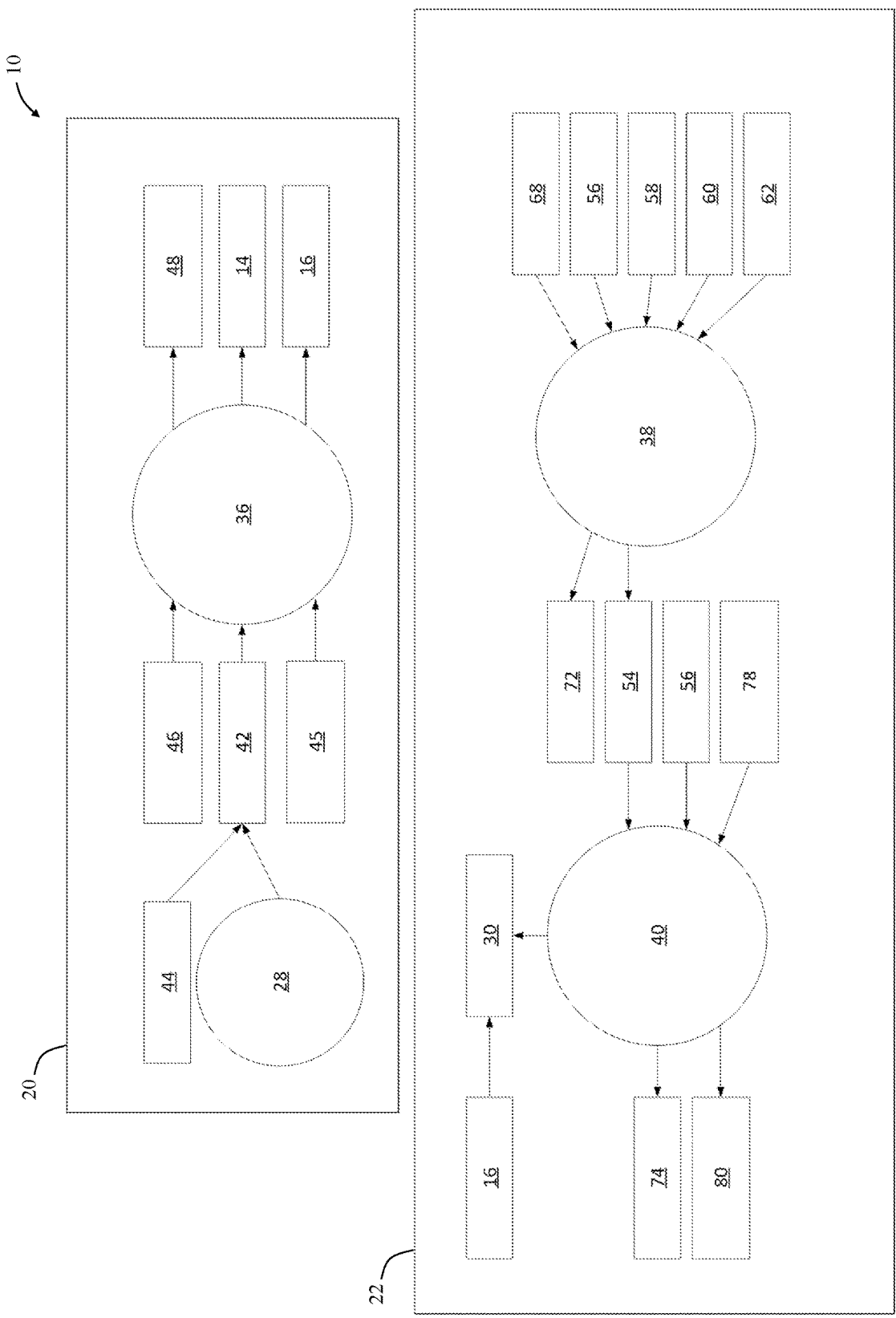
FIG. 2 illustrates a schematic view of the system operating according to a sensed mode in accordance with one non-limiting aspect of the present disclosure.

FIG. 2 illustrates the system 10 operating according to the sensed mode in accordance with one non-limiting aspect of the present disclosure. The position and sensorless systems 20, 22 may be configured to include observers 36, 38, 40 to facilitate computations and other calculations associated with generating the variables, values, information content, etc. contemplated herein, which for exemplary purposes are described with respect to a first observer 36, which may be referred to as a speed and position observer, a second observer 38, which may be referred to as a sensorless flux observer, and a third observer 40, which may be referred to as a sensorless speed and position observer. The observers 36, 38, 40 may perform calculations responsively to inputs thereto, and as described in more detail herein, various inputs may be utilized to facilitate one or more of the observers 36, 38, 40 acting effectively as a second order, proportional, integral, derivative (PID) controller or other feedback controller configured with suitable programming and/or instructions for generating intermediate values and ultimately the final speed and position 14, 16 according to the manipulations disclosed herein.

The position system 20 is presented in FIG. 2 as calculating the final speed and position 14, 16 according to the sensed position 28, i.e., without reliance on the sensorless position 30, such that during that period the sensorless system 22 may be deactivated or placed in a limited operational state. The limited operational state may correspond with the observers 38, 40 being inactive and/or the tools or modules providing inputs thereto similarly being inactive or otherwise in a non-processing condition. This inactivity may be referenced to a clock or looping time associated with the system 10 executing according to an interval or a cadence at which the relevant processors execute. Placing the sensorless system 22 into such a non-executing state may be beneficial in mitigating processor use, however, a subsequent transition from the sensed mode to the sensorless mode, i.e., from the position system 20 relying on the sensed position 28 to instead relying on the sensorless position 30, may be delayed until the sensorless system 22 is able to begin executing. As described below in more detail, one aspect of the present disclosure contemplates an initialization mode to mitigate this interval whereby the sensorless system 22 is prepared ahead of time so that it can begin executing as soon as desired. The sensorless system 22 may be typically kept in a non-executing state when the system 10 operating according to the sensed mode and thereafter operate according to the initialization mode before finally transitioning into the sensorless mode.

When in the sensed mode, the first observer 36 may be configured to calculate the final speed and position 14, 16 according to an angle error 42 derived from comparing a final position feedback 44 to the sensed position 28 and a final speed feedback 45. The corresponding calculation may optionally be tuned, adjusted or otherwise manipulated according to gain feedbacks 46, such as according to one or more gain estimates for resolver position, speed and acceleration 48 made by the first observer 36 during a prior execution, which may be referred to as position gains 48. The final position and speed feedbacks 44, 45, likewise, may result from a final speed and position 14, 16 calculations made by the first observer 36 during the prior execution. The feedbacks 44, 45, 46 and corresponding input of the sensed position 28 enables the final speed and position 14, 16 to be determined according to how closely the first observer 36 is able to calculate positioning of the motor, i.e., the final position 16, relative to the actual positioning, i.e., the sensed position 28, measured with the resolver 32 for the same or equivalent position. The operation of the position system 20 in this specific context, i.e., when relying on the sensed position 28 and its own feedback 44, 45, 46, etc., is readily understood to one having ordinary skill in the art.

Figure 3:
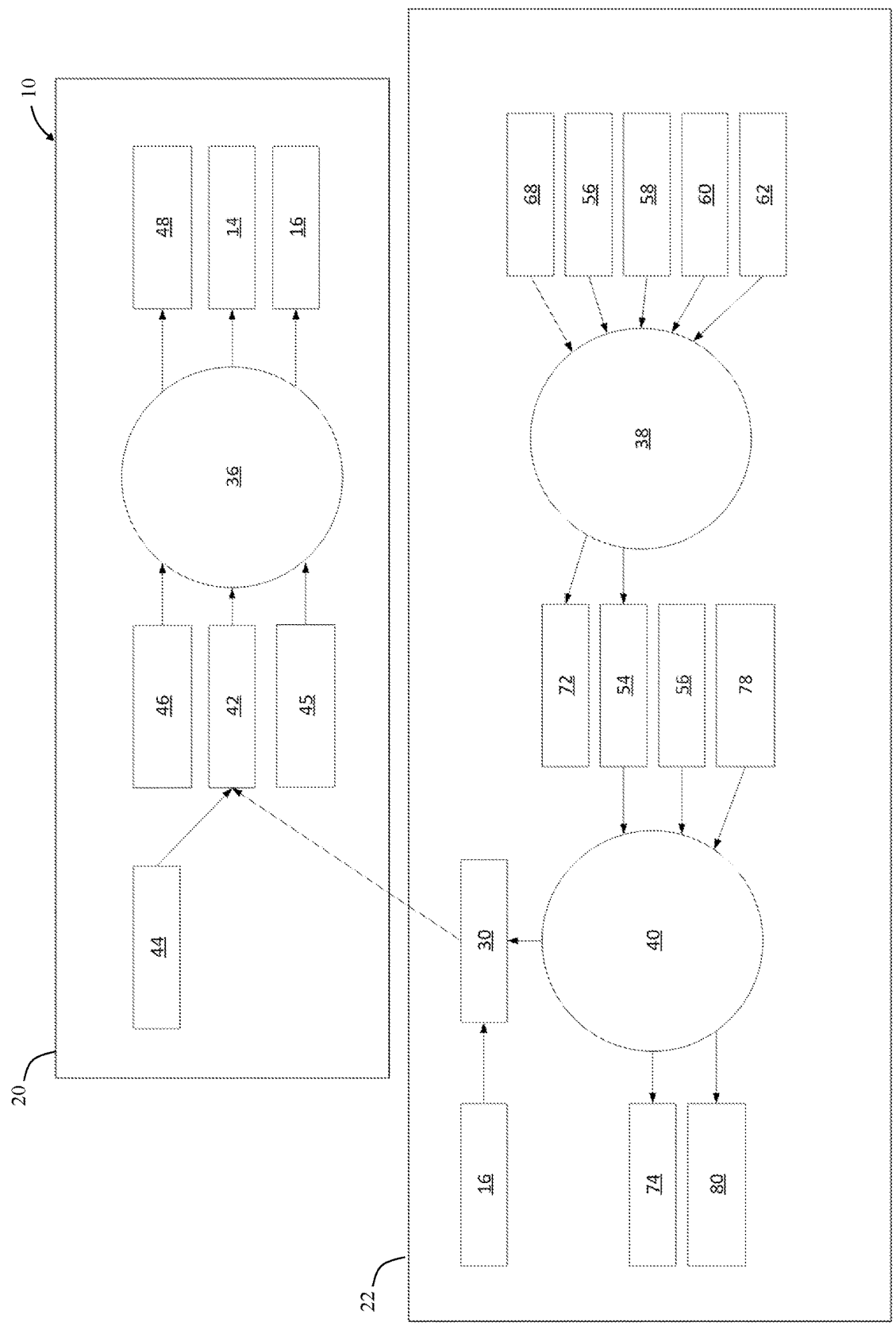
FIG. 3 illustrates a schematic view of the system operating according to a sensorless mode in accordance with one non-limiting aspect of the present disclosure.

FIG. 3 illustrates the system 10 operating according to the sensorless mode in accordance with one non-limiting aspect of the present disclosure. When in the sensorless mode, the first observer 36 may be configured to continue functioning in essentially the same manner except for the angle error 42 relying on the sensorless position 30 instead of the sensed position 28. The ability of the first observer 36 to indiscriminately rely upon either one of the sensed position 28 and the sensorless position 30 may result from a separation between the position system 20 and the resolver 32 and the cascading of the position system 20 and the sensorless system 22. This uninterrupted operation of the position system 20 may be beneficial in maintaining stability for dependent systems relying upon the final speed and position 14, 16 by enabling those systems to indiscriminately use the same inputs or receive the same values for the final speed and position 14, 16 without regard to the calculation thereof and/or the operation state of the resolver 32, while also permitting reuse of the position gains 48 and other historical experience learned by the first observer 36 when using either one of the sensed position 28 or sensorless position 30. The present disclosure, nonetheless, fully contemplates its use and application in combining one or more activities of the systems 20, 22 and/or requiring the position system 20 to discriminate between the sensed position 28 and the sensorless position 30, such as by adjusting the gains and calculations accordingly or notifying dependent systems of the measurement basis.

The sensorless system 22 may be configured to calculate the sensorless position 30 responsively to the inverter voltages and currents 29, 31. The reliability of these values, however, may be dependent on a sufficient amount of back electromotive force (EMF). The back EMF may result from permanent magnets of the motor inducing voltage and current as result of magnetic fields generated from rotating members of the motor opposing a direction of rotation. The back EMF may require the motor to be rotating above a corresponding speed threshold before having a sufficiently measurable effect. One non-limiting aspect of the present disclosure contemplates the sensorless system 22 leveraging the presence of the inverter voltage and current 29, 31 when the back EMF is above the speed threshold associated with reliable information for purposes of calculating the sensorless position 30, and thereby, the final speed and position 14, 16 when the resolver 32 is unavailable.

The first and third observers 36, 40 may be considered to effectively determine positioning of the motor based on differences between calculated and measured values for position of the motor, i.e., angle error. Unlike the first observer 36 doing so based on the angle error 42 derived from measurements taken with the resolver 32, the third observer 40 instead calculates the sensorless position 30 based on a sensorless angle error 54 derived from the measurements of the inverter voltage and current 29, 31. The values used for the angle errors 42, 54 may be equivalent values, i.e., the same scaled or type of values, such that the observer 36 may be able to essentially use either one of the angle errors 42, 54 to calculate the final position 16 and the final speed 14, optionally with some gain adjustment and tuning. At least in this regard, the third observer 40 may be configured to perform the same calculations as the first observer 36. As referenced above, one aspect of the present disclosure contemplates a cascaded arrangement that allows the position system 20 to operate independently of the sensorless system 22, and accordingly, rather than providing the angle error 54 to the observer 36, sensorless system 22 instead generates the sensorless position 30 based on the sensorless feedback, gain, etc. described below in more detail.

The second observer 38 may be configured to determine the sensorless angle error 54 according to a sensorless speed feedback 56, a sensorless flux 58, a sensorless DQ current 60 and a sensorless DQ voltage 62. The sensorless DQ current 60 and voltage 62 may result from the inverter voltage and current 29, 31 being adjusted to compensate for timing difference between the motor and voltage/current readings, i.e., to compensate for a delay associated with $V\alpha$ and $V\beta$ relative to actual position of the motor, or more particularly, a rotor of the motor. The following calculations for voltage and current may be used to generate the sensorless DQ current and voltage 60, 62 with compensation for the timing difference.

$$V_d = V_\alpha \cos \theta_S^{Dly} + V_\beta \sin \theta_S^{Dly}$$

$$V_q = -V_\alpha \sin \theta_S^{Dly} + V_\beta \cos \theta_S^{Dly}$$

where $$\theta_S^{Dly} = \theta_s + K_S \omega_s t$$

$$V_\alpha = \tfrac{2}{3} V_{DC} U_\alpha$$

$$V_\beta = \tfrac{2}{3} V_{DC} U_\beta$$

and $U_\alpha$, $U_\beta$ are the normalized values of $\alpha\beta$ voltage from the inverter sensor 29 and $K_S$ is a gain that is calibrated to adjust $V_\alpha$, and $V_\beta$ to account for a timing offset between sourcing the $\alpha\beta$ voltage and the sourcing of current, position, and other variables.

$$I_d = I_\alpha \cos\theta_S^{Dly} + I_\beta \sin\theta_S^{Dly}$$

$$I_q = -I_\alpha \sin\theta_S^{Dly} + I_\beta \cos\theta_S^{Dly}$$

Where $$\theta_S^{Dly} = \theta_s + K_{ISnsr}\omega_s t$$

$$I_\alpha = \frac{1}{3}(2I_a - I_b - I_c)$$

$$I_\beta = \frac{1}{\sqrt{(3)}}(I_b - I_c)$$

and $I_a$, $I_b$, and $I_c$ are measured phase currents from inventor sensor 31 and $K_{ISnsr}$ is a gain calibrated to adjust measured phase currents to align with the source of position and other variables.

The sensorless flux 58 may be calculated from the sensorless DQ current 60 in a matter that is understood by one having ordinary skill in the art. The sensorless flux and back EMF feedback 68 results from estimates for sensorless flux and back EMF 72 may be made by the second observer 38 during a prior execution. The sensorless speed feedback 56 may result from a sensorless speed 74 of the motor calculated by the third observer 40 during the prior execution. The third observer 40 uses the sensorless speed feedback 56 and a sensorless gain feedback 78 in cooperation with the senseless angle error 54 to calculate the sensorless position 30. The sensorless gain feedback 78 may be used to tune, adjust, or otherwise manipulate the sensorless position calculation 30 according to gain estimates for sensorless position, speed and acceleration 80 made by the third observer 40 during the prior execution.

In the second observer 38, the estimated flux and back EMF feedback 68 are compared to the calculated sensorless flux 58 to determine an error (not shown) in estimated flux and back EMF values 72. This error, when present, determines a calculated back EMF 72 along the d-axis, which would not be presented if the back EMF 72 fully aligned with the q-axis. In other words, if the sensorless position 30 used in calculations for sensorless flux 58, sensors DQ current 60, and sensorless DQ voltage 62 was entirely correct, then the d-axis component would be zero. This d-axis component for the back EMF 72, as such, is proportional to the error and sufficient for use in generating the sensorless angle error 54, i.e., an amount of the misalignment relative to the d-axis is used in this manner to generate a value for the senseless angle error 54. The third observer 40 uses the sensorless angle error 54 in essentially the same manner as the first observer 36 uses the angle error 42, i.e., to correct for errors in the estimated sensorless position 30.

Figure 4:
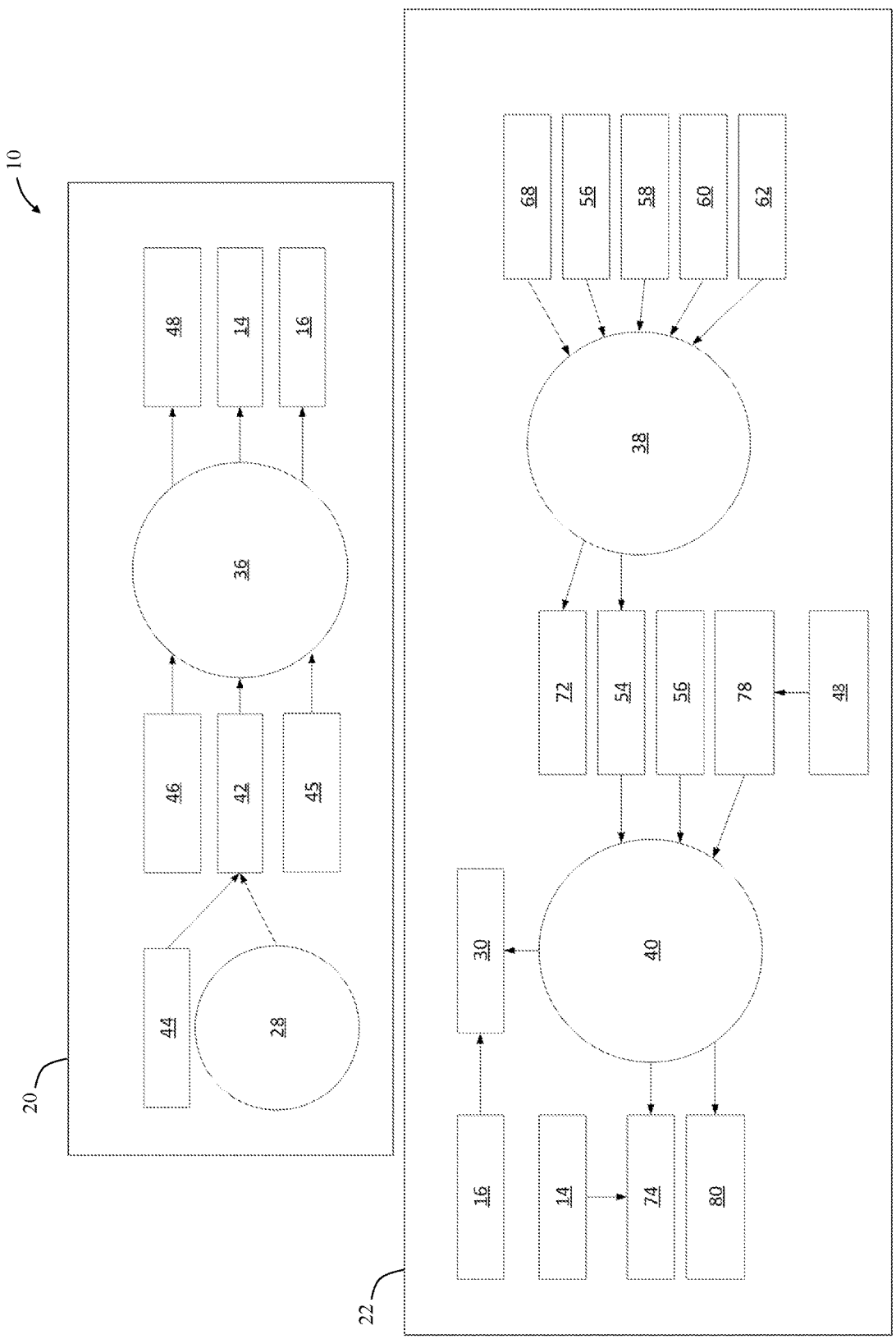
FIG. 4 illustrates a schematic view of the system operating according to an initialization mode in accordance with one non-limiting aspect of the present disclosure.

FIG. 4 illustrates the system 10 operating according to the initialization mode in accordance with one non-limiting aspect of the present disclosure. The initialization mode may coincide with temporary, initialization values from the position system 20 being used to compensate for delays associated with transitioning the sensorless system 22 to the sensorless mode. A beginning of the initialization mode corresponds with the diagnostics module 34 detecting variances or counts in the operation of the resolver 32, or other deviations surpassing ranges associated with normal operation, while the position system 20 at the same time continues to rely upon the resolver 32 to calculate the final speed and position 14, 16. An ending of the initialization mode may correspond with the sensorless system 22 transitioning to the sensorless mode such that the position system 20 switches to relying on the sensorless position 30, and optionally ceases to continue assessing counts of the resolver 32.

A duration between the beginning and ending of the initialization mode may be used to prepare the sensorless system 22 for use. This preparation may include providing values to the sensorless system 22 so that the second and third observers 38, 40 have data suitable to begin self-referencing operations associated with iteratively calculating the values noted in FIG. 3 before those values are actually needed at the position system 20. One non-limiting aspect of the present disclosure contemplates initializing the sensorless system 22 with the last known values and variables for the resolver 32 and the position system 20, e.g., providing corresponding information to the sensorless system 22 that is representative of the information last trusted to result from a reliable calculation of the sensed position 28. The initialization mode, in this manner, may correspond with initialization values for the sensorless system 22 being the final speed and position 14, 16 and the position gains 48 from the position system 20, i.e., the final position 16 may be used as the sensorless position 30, the final speed 14 as the sensorless speed 74 and the position gains 48 as the sensorless gains 78. The corresponding values, as such and as long as provided prior to the diagnostics module 34 determining a need to shut down the motor, may be considered as reliable representations of the last known, valid references.

The execution frequency of the second and third observers 38, 40 may dictate how many computation executions or computation cycles are needed before the sensorless system 22 becomes fully operational, i.e., how many times the second and third observers 38, 40 need to cycle through a sufficient number of inputs and outputs to generate reliable, self-referencing capabilities. This may include providing the initialization values to the sensorless system 22 and thereafter allowing the second and third observers 38, 40 to perform multiple calculations before the position system 20 is able to rely on the sensorless position 30.

Figure 5:
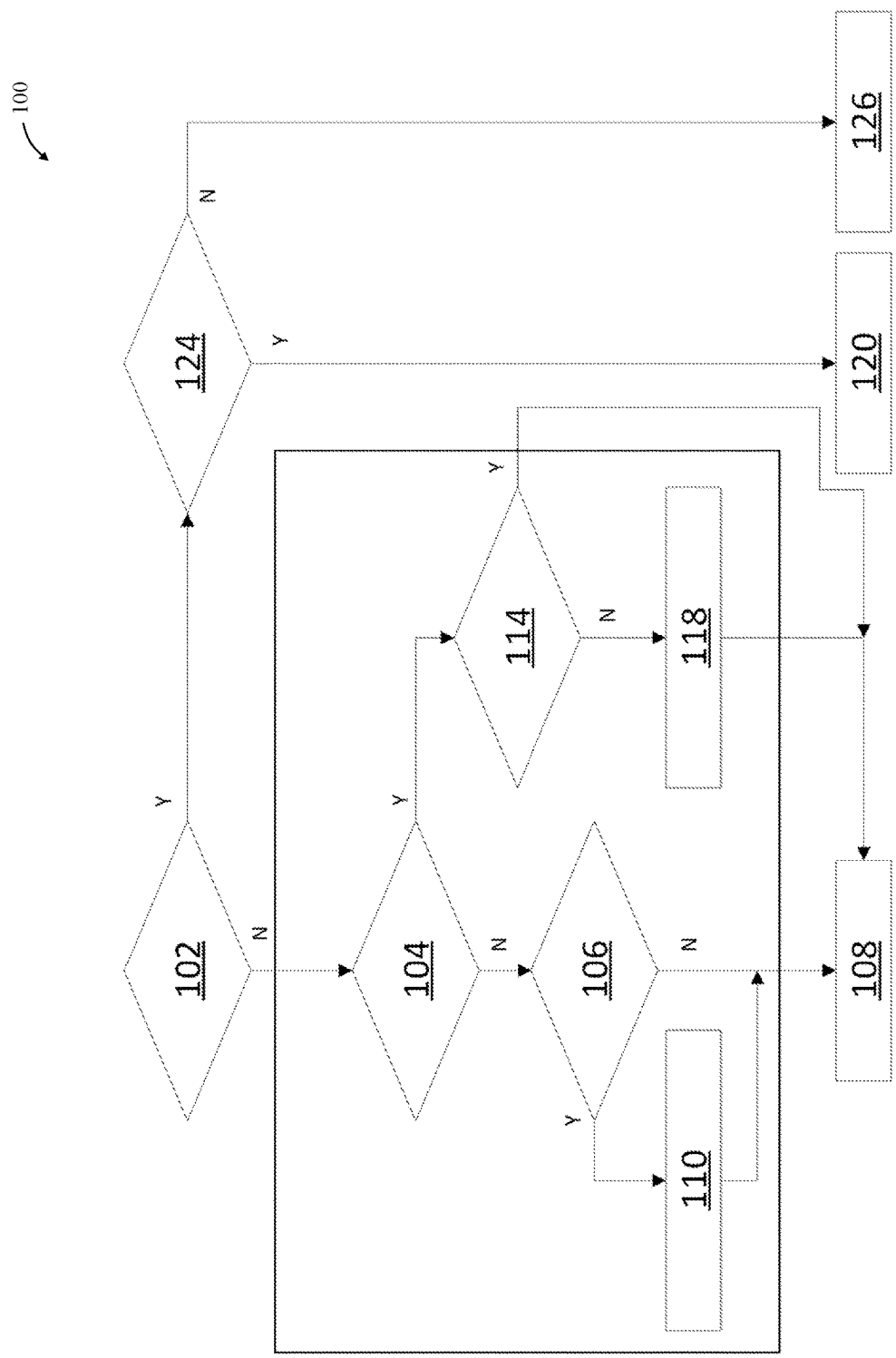
FIG. 5 illustrates a flowchart of a method for determining final speed and position in accordance with one non-limiting aspect of the present disclosure.

FIG. 5 illustrates a flowchart 100 of a method for determining the final speed and position 14, 16 in accordance with one non-limiting aspect of the present disclosure. The method generally relates to determining circumstances associated with a desirability of using the sensorless position 30 in place of or in cooperation with the sensed position 28 and the attendant processes and operations associated therewith. The illustrated process and sequences, as such, are shown merely for illustrative purposes as the corresponding operations and sequence may be varied or changed without deviating from the scope and contemplation of the present disclosure.

Block 102 relates to determining whether the resolver 32 has reached a state of operation where the sensed position 28 may be deemed as unavailable. Block 104 relates to determining whether a diagnostics process was previously engaged to assess operation of the resolver 32. The diagnostics process may be implemented responsively to detecting events associated with a potential need to switch from the sensed position 28 to the sensorless position 30, such as with the diagnostics module 34 or at a higher level by a controller of the system 10 or another controller included within the device or remotely therefrom. The diagnostics process may include a beginning and an ending whereby a beginning of the process may correspond with detecting one or more counts, e.g., individual events surpassing a threshold of desired operation, and an ending associated with the frequency or severity of the counts passing or failing to pass a sensorless threshold.

Setting the threshold according to frequency and/or severity may be beneficial in assuring a switch from the sensed mode to the sensorless mode occurs in response to warranted events. The resolver 32 may temporarily experience a disruption that may be compensated for according to self-correction of the first observer 36 and without having to switch to the sensorless mode. A count may also be a transitory event or an anomaly due to a short-lived environmental condition that changes before needing intervention. Delaying a switch to the sensorless mode may be helpful in prioritizing use of the resolver 32 and in limiting hysteresis associated with switching between the sensed and sensorless modes. The sensorless threshold may include multiple thresholds, such as one for frequency and one for severity, whereby the frequency threshold may be surpassed when a certain number counts are determined within a certain period of time and the severity threshold may be surpassed according to a severity of a singular count, e.g., the quantity of counts may be less than that needed to pass the frequency threshold but a severity of one or more of counts the may be sufficient to surpass the severity threshold.

The diagnostics process and the diagnostics module 34 are described with respect to monitoring operation of the resolver 32, and as such, the diagnostics and other processes associated therewith may be included as a subset or a portion of a larger monitoring system, such as a continuously running diagnostics control or architecture within the device. This monitoring system may monitor operation of a number of modules and elements within the device, and as such, the diagnostics process contemplated herein is merely representative of situations in which one or more triggering events, e.g., counts, instigate a subroutine, subprocess or other particular monitoring of the resolver 32 through engagement of the diagnostics module 34. The focus or independence of the diagnostics module 34 with respect to the resolver 32 is provided for exemplary purposes as the module 34 may be integrated into the larger monitoring system or otherwise implemented. One emphasis for noting the diagnostics module 34 is to highlight functionality for implementing close monitoring of the resolver 32 in response to a count and thereafter until a decision is made on switching to the sensorless mode.

Block 106 relates to determining whether the diagnostics process has been passed. The diagnostics process may cover a number of processing loops or executions such that Block 106 relates to determining whether the ongoing diagnostics process has determined with the resolver 32 to be operating in a state sufficient for continued use of the sensed position 28. Block 108 relates to operating according to a normal mode, i.e., the sensed mode, whereby the position system 20 relies upon the sensed position 28 to calculate the final speed and position 14, 16. Block 110 relates to determining the diagnostics process to have just ended, and correspondingly re-initializing the resolver 32 to begin providing the sensed position 28 and/or resetting or zeroing the initialization values and other parameters of the sensorless system 22 before returning to Block 108. This may occur, for example, in response to the diagnostics process failing to continue detecting counts.

Returning to Block 104, if the diagnostics process is already running and Block 102 has yet to determine the resolver to be unavailable, Block 114 relates to assessing whether the sensorless position 22 has been initialized. This may occur, for example, in response to the diagnostics module 34 detecting an initial or a first count associated with triggering the diagnostics process, i.e., an initial set of circumstances where additional monitoring of the resolver 32 is desired. Block 118 relates to engaging the initialization mode for the sensorless system 22, i.e., providing the initialization values from the position system 20 in anticipation of switching to the sensorless mode as depicted in FIG. 4 and described previously herein.

Returning to Block 102, if the resolver 32 is determined to be unavailable, an assessment is made at Block 124 as to whether the sensorless system 22 is operating, e.g., whether the sensorless system 22 has been properly initialized and switched to the sensorless mode. Block 120 relates to operating in the sensorless mode when the sensorless system 22 is properly initialized as depicted in FIG. 3 and described previously herein. Block 126 relates to a shutdown event whereby the position system 20 is shut down and/or systems or modules relying on the final speed and position 14, 16 therefrom are instructed as to implement alternative control strategies due to the final speed and position 14, 16 being unreliable or otherwise unavailable.

The present disclosure may be embodied in many different forms. Representative examples are shown in the various drawings and described herein in detail as non-limiting representations of the disclosed principles. To that end, elements and limitations described above, but not explicitly set forth in the appended claims, should not be incorporated into the claims, singly or collectively, by implication, inference, or otherwise. Moreover, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items.

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

Words of approximation such as "about", "almost", "substantially", "generally", "approximately", etc., may be used herein in the sense of "at, near, or nearly at", or "within 0-5% of", or "within acceptable manufacturing tolerances", or logical combinations thereof. Also as used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function. For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the disclosure, as defined by the claims. Spatially relative terms, such as "inner," "outer," "beneath," "below," "lower," "above," "upper," and the like, may be used herein for ease of description to describe one element or feature's relationship to another element(s) or feature(s) as illustrated in the drawing figures. Spatially relative terms may be intended to encompass different orientations of the device or system in use or operation in addition to the orientation depicted in the drawing figures.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method for determining a final speed and position of a motor used in an electric vehicle, the method comprising:
    calculating the final speed and position as a function of a sensed position with a resolver when the resolver is available, the sensed position being generated by the resolver responsively to measuring rotation of the motor;
    calculating the final speed and position of the motor as a function of a sensorless position by switching to a sensorless system from the resolver when the resolver is unavailable to provide the sensed position or the sensed position by the resolver is in need of supplementation; and
    controlling the motor by implementing a shutdown of the motor when the resolver is unavailable and the senseless system is unavailable.

2. The method according to claim 1 further comprising, after calculating the final speed and position according to the sensed position, executing an initialization mode before calculating the final speed and position as a function of the sensorless position.

3. The method according to claim 1 further comprising a position system including a first observer for calculating the final speed and position as a function of an angle error and one or more variables used to adjust gain.

4. The method according to claim 1 further comprising generating the final speed and position for use with a controller included within the vehicle, the controller being configured to process the final speed and position to control one or more vehicle operations.

5. The method of claim 1 including:
    determining a sensed position of the motor with a resolver responsively to measuring rotation of the motor; and
    calculating a sensorless position with a sensorless system responsively to a voltage and a current of the motor, wherein the sensorless system is configured to adjust the voltage and the current to account for a timing difference between the motor based on the sensed position and the voltage and current based on the sensorless position.

6. The method according to claim 2 further comprising initializing the sensorless system with one or more last known values of the sensed position as part of the initialization mode.

7. The method according to claim 3 further comprising, when the resolver is available, determining the angle error as a function of a final position feedback for the final position, a final speed feedback for the final speed, and the sensed position.

8. The method of claim 5, including operating the motor with a position system according to a first mode and a second mode, wherein the first mode calculating the final speed and position as a function of the sensed position, the second mode calculating the final speed and position as a function of the sensorless position.

9. The method according to claim 6 further comprising beginning a diagnostics process prior to beginning the initialization mode, the diagnostics process determining whether the resolver is available or unavailable.

10. The method according to claim 7 further comprising the sensorless system including a second observer and a third observer, the second observer calculating a sensorless angle error, the third observer calculating the sensorless position as a function of the sensorless angle error.

11. The method according to claim 9 further comprising completing the initialization mode before completing the diagnostics process.

12. The method according to claim 11 further comprising resetting the sensorless system responsively to the diagnostics process indicating the resolver to be available.

13. The method according to claim 12 further comprising resetting the sensorless system by zeroing the last known values or one or more other values associated with the sensorless system.

14. A system for determining a final speed and position of a motor used in an electric vehicle, the system comprising:
    a resolver configured to determine a sensed position responsively to measuring rotation of the motor;
    a sensorless system configured to calculate a sensorless position responsively to a voltage and a current of the motor; and
    a position system configured to operate according to a first mode and a second mode, the first mode calculating the final speed and position as a function of the sensed position, the second mode calculating the final speed and position as a function of the sensorless position, wherein the sensorless system is configured to adjust a measurement of a voltage and a current to the motor to account for a timing offset resulting from a delay obtaining the measurement of the voltage and the current with the sensorless position.

15. The system according to claim 14 further comprising an initialization system configured to facilitate an initialization of the sensorless system while the position system is operating according to the first mode, the initialization system providing the sensorless system with one or more last known values of the position system.

16. The system according to claim 14 wherein the position system is configured to operate according to the first mode when the sensed position is available from the resolver and according to the second mode when the sensed position is unavailable and a speed of a vehicle having the motor is above a threshold, the threshold being associated with generating back electromotive force (EMF) sufficient for generating measurable amounts of the voltage and current, the measurable amounts being needed for the sensorless system to calculate the sensorless position.

17. A system for determining a final speed and position of a motor used in an electric vehicle, the system comprising:
  a first observer configured to operate according to execution of a plurality of first instructions stored on a corresponding non-transitory computer readable storage medium, the first instructions being sufficient to:
    calculate the final speed and position as a function of an angle error; and
    calculate the angle error as a function of a final position feedback, a final speed feedback, and either one of a sensed position and a sensorless position;
  a second observer configured to operate according to execution of a plurality of second instructions stored on a corresponding non-transitory computer readable storage medium, the second instructions being sufficient to calculate a sensorless angle error as a function of a sensorless speed feedback, a sensorless flux, a sensorless DQ current and a sensorless DQ voltage; and
  a third observer configured to operate according to execution of a plurality of third instructions stored on a corresponding non-transitory computer readable storage medium, the third instructions being sufficient to calculate a sensorless speed and the sensorless position as a function of the sensorless angle error and a sensorless speed feedback.

18. The system according to claim 17 wherein the third instructions are sufficient to:
  operate according to an initialization mode, the initialization mode including the third observer utilizing:
    the final position feedback as the sensorless position; and
    the final speed as the sensorless speed; and
  operate according to a running mode, the running mode including the third observer calculating the sensorless speed and position independently of the final speed and position.

19. The system according to claim 17 wherein the second instructions are sufficient to implement an adjustment for a timing difference between the motor and voltage and current readings used to calculate the sensorless DQ voltage and current.

20. The system according to claim 18 wherein the second instructions are sufficient to:
  operate according to the initialization mode, the initialization mode including the second observer utilizing the final speed and position to calculate the sensorless flux, the sensorless DQ current, and the sensorless DQ voltage; and
  operate according to the running mode, the running mode including the second observer calculating the sensorless angle error as a function of the sensorless speed feedback.

* * * * *